US006000833A

United States Patent [19]

Gershenfeld et al.

[11] Patent Number: 6,000,833

[45] Date of Patent: Dec. 14, 1999

[54] EFFICIENT SYNTHESIS OF COMPLEX, DRIVEN SYSTEMS

[75] Inventors: Neil Gershenfeld, Somerville; Bernd Schoner, Cambridge; Eric Metois, Somerville, all of Mass.

[73] Assignee: Massachusetts Institute of Technology, Cambridge, Mass.

[21] Appl. No.: 08/785,744

[22] Filed: Jan. 17, 1997

[51] Int. Cl.[6] .............................. G06F 17/00; G10H 7/00

[52] U.S. Cl. .............................................. 364/578; 84/600

[58] Field of Search .................................... 364/578, 512; 84/600; 395/500

[56] References Cited

U.S. PATENT DOCUMENTS

| | | | |
|---|---|---|---|
| 4,018,121 | 4/1977 | Chowning | 84/1.01 |
| 4,133,242 | 1/1979 | Nagai et al. | 84/1.13 |
| 4,178,822 | 12/1979 | Alonso | 84/1.27 |
| 4,215,617 | 8/1980 | Moorer | 84/1.03 |
| 4,455,911 | 6/1984 | Yamada | 84/1.19 |
| 5,191,161 | 3/1993 | Oya | 84/604 |
| 5,247,261 | 9/1993 | Gershenfeld | 324/716 |
| 5,268,528 | 12/1993 | Iwase | 84/660 |
| 5,381,512 | 1/1995 | Hotlon et al. | 395/2.41 |
| 5,424,963 | 6/1995 | Turner et al. | 364/578 |
| 5,521,322 | 5/1996 | Morikawa et al. | 84/603 |
| 5,596,159 | 1/1997 | O'Connell | 84/622 |
| 5,682,463 | 10/1997 | Allen et al. | 395/2.39 |
| 5,719,345 | 2/1998 | Chen | 84/624 |
| 5,761,317 | 6/1998 | Pritchard | 381/61 |

FOREIGN PATENT DOCUMENTS

| | | | |
|---|---|---|---|
| 0 583 043 A2 | 4/1987 | European Pat. Off. | G10H 5/00 |

OTHER PUBLICATIONS

Excerpt from Gershenfeld et al., *The Future of Time Series*, (Addison–Wesley 1993).

*Primary Examiner*—Kevin J. Teska
*Assistant Examiner*—A. S. Roberts
*Attorney, Agent, or Firm*—Cesari and McKenna, LLP

[57] ABSTRACT

Efficient synthesis of complex, driven systems is accomplished using a probabilistic framework according to which the physics of system behavior are modeled in terms of the effective degrees of freedom relevant to observed behavior, instead of modeling the physical configuration or the output waveform. A replica of the system's behavior in response to external stimulus is developed computationally, and the model used to replace (or facilitate replacement) of the system with, for example, a physical representation programmed to behave in accordance with the model. The invention may be applied to develop a model capturing the behavior of a complex musical instrument such as a violin; the model then may be embodied in any physically appealing format (e.g., as a plastic replica of the original violin that would, absent the implemented model, produce no sound if bowed; or a keyboard or other musical instrument whose response to being "played" is to generate the sounds of the original violin).

17 Claims, 7 Drawing Sheets

EFFICIENT SYNTHESIS OF COMPLEX, DRIVEN SYSTEMS

FIELD OF THE INVENTION

The present invention relates generally to synthesis of the behavior of complex physical systems, and in particular to the use of probabilistic modeling techniques to these ends.

BACKGROUND OF THE INVENTION

Complex physical systems, such as musical instruments, are difficult to physically reproduce or replicate faithfully in terms of their structures, minute variations of which can result in observably different response characteristics. For such systems, it may be preferable to mathematically model the behavior of the system and sythesize the output based on the model; that is, the model becomes (or operates) as a replacement for the physical system itself.

Simple physical systems (or more complex systems treated simply for purposes of approximation) of course can be straightforwardly "modeled" through direct use of the physical parameters that govern the system's behavior; for example, the motion of a simple pendulum can be precisely characterized (ignoring air resistance) in terms of length and angular acceleration, or the vibration of a string in terms of amplitude and angular frequency. Far less tractable is the goal of constructing, for example, an electronic violin capable of emulating a Stradivarius with any degree of fidelity. Complex systems contain tremendous numbers of degrees of freedom; accordingly, "first principles" physical modeling of their responses is highly difficult, both in terms of computational requirements—to keep up with changes in the many degrees of freedom—and sufficiently precise measurements of their values. Not surprisingly, approaches to physical modeling require significant approximation. For example, European Patent Application No. 0583043 ("Tone Generation System") describes the use of digital waveguides to model the behavior of musical instruments. The modeled waveforms do not represent underlying degrees of freedom in any rigorous sense, and are not related in any physically meaningful way to system inputs.

A more computationally tractable approach involves approximation or sampling techniques, whereby, for example, a list of known inputs and observed outputs is constructed, and behavior "modeled" through lookup and interpolation among entries; see, e.g., U.S. Pat. No. 5,521,322. This approach is limited, however, by the coarseness of the entries and the constrained generality of any model unconnected with the underlying physics of the system. Thus, musical instruments have been synthesized by storing output sounds for numerous known inputs—i.e., specific player manipulations of the actual instrument—and the instrument synthesized through interpolation among the sampled sound based on provided input. In practice, while short segments of such recorded sounds can be faithful, the overall response to the player's actions is not.

A related approach, exemplified by the disclosure of U.S. Pat. No. 4,018,121 (to Chowning) is to model the output behavior of a physical system as a mathematical waveform, without reference to the underlying physical degrees of freedom. Although output modeling may reflect greater attention to actual system behavior than a mechanistic interpolation approach, the validity of the output model, once again, is ultimately limited due to the absence of any connection with the true system degrees of freedom.

The "first principles" approach can be made more tractable by recognizing that not all possible physical degrees of freedom participate in the generation of a system output; a faithful model of a Stradivarius, for example, does not require detailed knowledge at the molecular level. Thus, machine learning and state-space reconstruction have been employed as intermediate approaches between a complete but computationally unachievable specification of a physical system, on one hand, and purely numerical techniques without reference to system state on the other. State-space reconstruction by the technique of time-delay embedding permits recovery and modeling of those effective physical degrees of freedom relevant to observed behavior; that is, the part of the "configuration space" (which specifies the values of all potentially accessible physical degrees of freedom) that the system actually explores as its dynamics unfolds. In accordance with the technique of time-delay embedding, a time series is measured from such a system, and the entries used to define a lag vector. For example, if $\vec{s}$ is the state vector describing the system (in terms of effective degrees of freedom rather than the complete configuration space), $d\vec{s}/dt=f(\vec{s})$ denotes the effective governing equations, and the measured quantity observed over time is $y=y(\vec{s}(t))$ (where y is a vector or a scalar quantity such as amplitude or temperature), then given a delay time $\tau$ and a dimension d, a lag vector $\vec{x}$ may be defined as $\vec{x}=(y_t, y_{t-\tau}, \ldots, y_{t-(d-1)\tau})$. The central result of time-delay embedding is that the behavior of $f(\vec{s})$ and $\vec{x}$ will differ only by a smooth, local, invertible change of coordinates for almost every possible choice of $\vec{s}$, $y(\vec{s})$ and $\tau$, so long as d (the "embedding dimension," i.e., the number of time lags) is sufficiently large, y depends on at least some of the components of $\vec{s}$, and the remaining components of $\vec{s}$ are coupled by the governing equations to the ones that influence y; this result can be generalized to linear transformations on lag vectors as well.

In other words, if an experimentally observed quantity arises from deterministic governing equations, it is possible to use time-delay embedding to recover a representation of the relevant internal degrees of freedom of the system from the observable; and because the relevant degrees of freedom typically are a relatively small subset of the configuration space, the solution, while highly accurate, is also computationally tractable. System behavior can thus be modeled based on the mapping between the lag vector, whose time-varying components are measurable, and internal (and therefore generally inaccessible) system states.

In a driven system, some user input u is imposed on the system and affects its dynamic behavior; for example, the system might be a violin and the input the player's drawing of the bow. In this case, while it would be desirable to predict the behavior of the system from the input rather than the observable or the inaccessible internal degrees of freedom, this is generally not possible. Put differently, the evolution of the system cannot be described simply as $y=f(\vec{u})$, since the system's behavior depends on its prior history as well as the input; the system is said to have "memory." If $\vec{x}$ is the embedding vector—which, again, maps smoothly to internal system behavior and therefore provides a complete specification of the internal degrees of freedom relevant to the observable—then the behavior of the system can be modeled given knowledge of the embedding vector $\vec{x}$, which includes time lags on both y and $\vec{u}$. Accordingly, it is possible to use time-delay embedding to predict y from time lags on y and $\vec{u}$, i.e., the history of the output and the input. For example, in the above-noted case of a violin, y is amplitude (a scalar quantity) and $\vec{u}$ is the time-varying bow position and/or fingering. With $\vec{x}$ characterized, a function $y=f(\vec{x},\vec{u})$ can be derived to model and predict system behavior in terms of the unobservable degrees of freedom (modeled by $\vec{x}$) and the observable input $\vec{u}$.

The variables y and $\vec{x}$ are related by an unknown joint probability density $p(y,\vec{x})$ (which for a deterministic system reduces to a prediction surface $y(\vec{x})$, while for a stochastic system samples can be drawn from $p(y,\vec{x})$ to emulate the system's behavior). Given a set of experimental measurements $\{y_n, \vec{x}_n\}_{n=1}^{N}$, the goal of data analysis is to infer a model that can predict the output or its distribution from a measurement of a new input, and to characterize the relationship between y and $\vec{x}$. Since there is rarely enough data to estimate the unconditional density $p(y,\vec{x})$, it is more common to seek conditional quantities such as the likelihood $\langle y|\vec{x}\rangle$ and the error $\langle \sigma_y^2|\vec{x}\rangle$. Traditionally these have been written in the form $$y = \sum_{m=1}^{M} \beta_m f_m(\vec{x}),$$

where the $\beta_m$ quantities are unknown linear coefficients and the $f_m$ quantities are known basis functions (such as polynomial expansions). More powerful techniques, such as neural networks, utilize coefficients inside nonlinear basis functions of the form $$y = \sum_{m=1}^{M} f(\vec{x}, \beta_m).$$

Any phenomenological model must balance underfitting (in which the model is not flexible enough to describe the data) and overfitting (in which the model is so flexible that it describes noise in the data that does not generalize). While this has been done by varying the number M of basis functions $f_m$, such an approach is rarely justified because globally simple behavior might require a large number of terms to be represented in a given basis.

DESCRIPTION OF THE INVENTION

BRIEF SUMMARY OF THE INVENTION

The present invention approaches the problem of synthesis of driven systems by modeling the effective underlying degrees of freedom, preferably using a probabilistic framework. In accordance with the invention, a replica of the system's behavior in response to external stimulus is developed computationally, and the model used to replace (or facilitate replacement) of the system with, for instance, a physical representation programmed to behave in accordance with the model. For example, the invention may be applied to develop a model capturing the behavior of a complex musical instrument such as a violin; the model then may be embodied in any physically appealing format (e.g., as a plastic replica of the original violin that would, absent the implemented model, produce no sound if bowed; or a keyboard or other musical instrument whose response to being "played" is to generate the sounds of the original violin). It is important to stress that once the model of system behavior (based on effective degrees of freedom) is complete, its utilization is entirely within the user's discretion.

The preferred embodiment of the invention utilizes a flexible, probabilistic model of behavior that includes information based on prior beliefs. The simplest way to approach such an analysis is to constrain the probabilities with extra terms (called regularizers) that express prior beliefs about the data. One may use a Bayesian framework to identify the best model m as the one that maximizes the likelihood that it was generated from the measured data d:

$$\max_m p(m\mid d) = \max_m \frac{p(d\mid m)p(m)}{p(d)}$$

The quantity $p(d|m)$ measures the model mismatch (i.e., the fitting error, so that for a Gaussian error model it leads to the familiar least-squares statistic), $p(m)$ is the "regularizer" and represents prior beliefs characterizing a good model, and $p(d)$ represents prior beliefs about the likelihood of a data set (and becomes relevant only when analyzing multiple data sets).

Common regularizers include maximum entropy (which handles discontinuities well but cannot capture local smoothness) and integrated curvature (which enforces smoothness but rounds out discontinuities). A more general problem with regularization is the global nature of its operation; the statements concerning prior probabilities may not be valid locally. Regularized models also do not simplify in a natural fashion; a linear system might be described, for example, by many nonlinear basis functions plus a regularizer. Though such a nonlinear model may accurately describe a data set, it fails to offer substantial insight into the behavior of the modeled system. Finally, maximization of the overall cost function required by regularization necessitates a nonlinear search that may be extremely computationally intensive in a high-dimensional space.

In accordance with the preferred embodiment of the present invention, the joint probability density $p(y,\vec{x})$ is expanded in clusters, each of which is associated with a local model (which may be linear or nonlinear). As a result, the system's behavior is represented locally, allowing for separate modeling of different aspects of the system's dynamics, and ultimately leading to a more accurate, simplified overall representation that avoids both underfitting and overfitting. The modeling technique of the present invention is computationally efficient, exhibits good convergence and stability properties, is capable of expressing prior knowledge about the system, and is equally suited to description of simple and complex behavior.

In a first aspect, the method of the invention is used to emulate the behavior of a nonlinear physical system that generates an output in response to a stimulus such as physical manipulation. The system may be stochastic or fully determinstic, and the term "physical system" as used herein connotes either type. In accordance with the method of the invention, an input-output data set is first recorded by imposing a plurality of input manipulations on the system and measuring the resulting outputs; for example, in the context of a musical instrument, sensors are applied to the instrument and associated with the player, and both the audio outputs and player inputs are recorded as the instrument is played arbitrarily to explore the range of possible responses. These data are used to recover the internal system degrees of freedom, e.g., using state-space reconstruction embedding techniques. The system internal degrees of freedom are related to system outputs as a prediction surface (for a fully determinstic system) or a probability density (for a stochastic system) in the joint input-output space, and a predicted system output is thereby obtained for a given manipulation by (i) estimating values for the internal degrees of freedom that the manipulation would cause if applied to the system, and (ii) based on the modeled relationship between internal degrees of freedom and system output, computing an expected system output. For a determinstic system, the expected output is single-valued; for a stochastic system, the expected output is represented as a distribution that may be randomly sampled.

The approach of the invention is distinct from prior-art systems, such as those that merely sample system output or calculate a complete representation of system physics; in effect, the present invention samples the physics.

In a second aspect, the invention comprises a method of modeling one or more output characteristics of a system based on a set of input parameters. An emulation process relating each output characteristic to the input parameters is modeled according to a joint probability density therebetween by expanding the joint probability density in a plurality of clusters, each cluster (i) being associated with a local model relating the ouput characteristic to the input parameters and (ii) valid over a range of values of the input parameters according to a probability distribution, the joint probability density for an input set of values for the input parameters being a weighted sum of the clusters in accordance with the probability distributions thereof. Using this model, a set of input values is developed for the input parameters, and the emulation process used to produce the output characteristic.

In a third aspect, the invention comprises hardware apparatus for implementing the foregoing.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. Mathematical Framework

A physical system responsive to external manipulation can be modeled as a space of vectors $\vec{s}$ representing the set of effective degrees of freedom available to the system (i.e., those relevant to the observed output); an embedding vector $\vec{x}$ at any time is representative of (that is, can be mapped to through a smooth change of coordinates to) the effective internal degrees of freedom $\vec{s}$. A time-varying input stimulus $\vec{u}(t)$ applied to the system produces a time-varying output state y, which may be a scalar (e.g., temperature or amplitude) or vector quantity. The present approach allows for characterization of system behavior in terms of a plurality of local models, each of which is valid over a range of relevant degrees of freedom according to a probability distribution, so that each applies with greatest accuracy within a probabilistically defined subset of the degrees of freedom.

Figure 1:
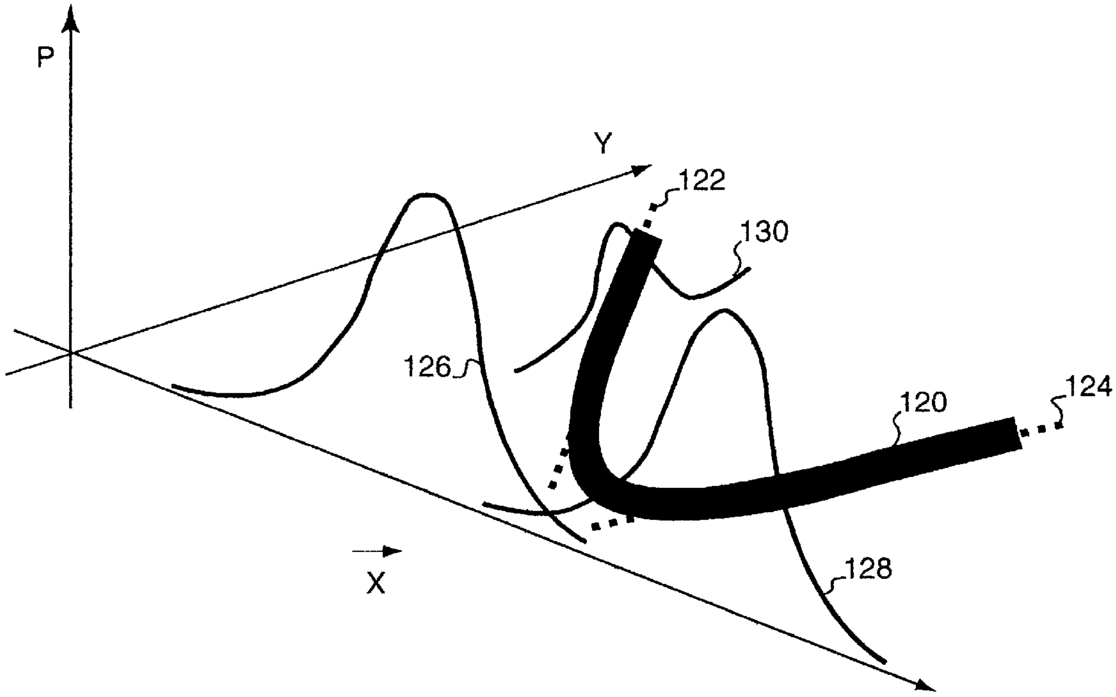
FIG. 1 graphically depicts the behavior of a driven, dynamic system and its representation in accordance with the present invention.

This is shown in FIG. 1. Suppose that the true physical behavior of the system (expressed in terms of the embedding vector) is nonlinear and somewhat stochastic, as described by the indistinct parabola 120; in other words, various output states of the system are associated, in a nonlinear fashion, with different values of $\vec{x}$ that are determined or affected by an input stimulus. The true behavior 120 can be approximated by a pair of local linear models 122, 124, each of which is valid over—and in accordance with—a respective probability distribution 126, 128 associated therewith and defining a domain of influence. Distributions 126, 128 can also be viewed as defining an "input width," i.e., a probabilistic expression of the relevant input and internal degrees of freedom. The "output" (y value) produced by the local model can similarly be expressed probabilistically (as indicated, in the case of local model 122, by an output probability distribution 130), so that the output value has a stochastic width rather than a precise value (concording with the true behavior 120).

In accordance with the invention, the joint probability density $p(y, \vec{x})$ is expanded into a series of clusters $c_m$, each of which is associated with a local model, a probabilistically defined domain of influence, and an output distribution, all as defined above. The domain of influence can be defined in the input space, and can optionally be defined in time, e.g., according to the theory of recursive estimation—that is, based on a history of inputs and outputs, and cluster-transitioii probabilities.

Thus, while the complete joint density is ultimately used to predict values of y given an input stimulus and its expected effect on $\vec{x}$, the joint density is represented by a plurality of local models, thereby facilitating the use of simple (or at least locally accurate) models whose respective contributions to the joint density do not extend beyond their true relevance to system behavior.

The joint density is separated into a conditional probability given a cluster, multiplied by a cluster weight:

$$p(y, \vec{x}) = \sum_{m=1}^{M} p(y, \vec{x} \mid c_m) p(c_m) \quad \text{(Eq. 1)}$$

The conditional probability may then be separated into input and output parts as follows:

$$p(y,\vec{x}) = \sum_{m=1}^{M} p(y \mid \vec{x}, c_m) p(\vec{x} \mid c_m) p(c_m) \tag{Eq. 2a}$$

$$= \sum_{m=1}^{M} \frac{1}{\sqrt{2\pi\sigma_{m,d}^2}} e^{-[y-f(\vec{x},\beta_m)]^2/2\sigma_{m,y}^2} \prod_{c=1}^{D} \frac{1}{\sqrt{2\pi\sigma_{m,d}^2}} e^{-(x_d-\mu_{m,d})^2/2\sigma_{m,d}^2} p(c_m) \tag{Eq. 2b}$$

for M clusters (and, consequently, M local models), each local model being represented by a different instance of the function $f(\vec{x}, \beta_m)$ with unknown parameters $\beta_m$. The first factor, corresponding to $p(y|\vec{x}, c_m)$, represents the output probability distribution, while the second factor, corresponding to $p(\vec{x}|c_m)$, corresponds to the input probability distribution over the local model's domain of influence. The parameter $p(c_m)$ represents the weighting associated with the cluster. The quantity $\sigma_{m,y}$ corresponds to the width of the output distribution of the local model m, while $\sigma_{m,d}$ denotes the width of the input distribution. The quantity $\mu_{m,d}$ specifies the mean of the input distribution, i.e., the point corresponding to maximum probability (and maximum accuracy of the model m). The vector $\vec{x}$ is of the form $\vec{x}=(x_1, \ldots, x_d, \ldots, x_D)$, where D is the embedding dimension; for example, in modeling a musical instrument, each of the x terms may be a time-lagged value of the audio output and the sensor readings that represent a player's manipulations of the instrument.

The foregoing framework assumes a scalar output and separable Gaussians; it can be straightforwardly generalized to vector output (i.e., where y has more than one component), and using non-separable input Gaussians with covariances. Specifically, the input term $$p(\vec{x} \mid c_m) = \prod_{c=1}^{D} \frac{1}{\sqrt{2\pi\sigma_{m,d}^2}} e^{-(x_c-\mu_{m,d})^2/2\sigma_{m,d}^2} \tag{Eq. 2c}$$

uses separable Gaussians and just the variances; non-separable Gaussians can be represented by replacing this term with $$p(\vec{x} \mid c_m) = \frac{|C_m^{-1}|^{1/2}}{(2\pi)^{D/2}} e^{\frac{1}{2}(\vec{x}-\vec{\mu}_m)^T \cdot C_m^{-1} \cdot (\vec{x}-\mu_m)} \tag{Eq. 2d}$$

where $[C_m]_{ij}=\{(x_i-\mu_{m,i})(x_j-\mu_{m,j}\}_m$ is the cluster-weighted covariance matrix. The first input term (Eq. 2c) requires D parameters (the variances), while Eq. 2d requires $D^2$ parameters (the covariances). The former is better suited to high dimensions, but forces the clusters to line up with the axes. The latter is more flexible, but requires excessive storage in high dimensions.

Similarly, the output term $$p(y \mid \vec{x}, c_m) = \frac{1}{\sqrt{2\pi\sigma_{m,d}^2}} e^{-([y-f(\vec{x},\beta_m)])^2/2\sigma_{m,y}^2} \tag{Eq. 2e}$$

can be generalized to $$p(\vec{y} \mid \vec{x}, c_m) = \prod_{d=1}^{D} \frac{1}{\sqrt{2\pi\sigma_{m,y,d}^2}} e^{-[y_d-f_d(\vec{x},\vec{\beta}_m)]^2/2\sigma_{m,y,d}^2} \tag{Eq, 2f}$$

or $$p(\vec{y} \mid \vec{x}, c_m) = \frac{|C_{m,y}^{-1}|^{1/2}}{(2\pi)^{D/2}} e^{\frac{1}{2}(\vec{y}-\vec{f}(\vec{x},\vec{\beta}_m))^T \cdot C_{m,y}^{-1} \cdot (\vec{y}-\vec{f}(\vec{x},\vec{\beta}_m))} \tag{Eq. 2g}$$

where $[C_m]_{ij}=\{(y_i-f_i(\vec{x}, \beta_m))(y_j-f_j(\vec{x}, \beta_m))\}_m$.

In practice, $\vec{x}$ is generally determined by embedding. In particular, time-delay embedding of a set of N known input stimuli $u_1 \ldots u_n$ and the corresponding system outputs $y_1 \ldots y_N$ (i.e., a set of experimental or "training" measurements $\{y_n, u_n\}_{n=1}^{N}$) characterizes y in terms of the relevant system degrees of freedom comprehended in $\vec{x}$ (i.e., as a set of corresponding parameters of the form $\{y_n, \vec{x}_n\}_{n=1}^{N}$). The greater the embedding dimension, the more accurate the system characterization will be; an excessively large dimension, however, wastes resources and may result in some inaccuracy (as discussed further below).

To use the approach of the invention, the user need specify at the outset only the number M of clusters and a form of the local model f reasonable for the system under study. M in effect varies the number of system "features" to be explained and is used to control underfitting and overfitting; that is, if the model captures too many output features, it will be "overfitted" and inappropriately include noise in its representation of system behavior. A technique for optimizing M is discussed below.

It is possible to use clusters with different types of local models if more than one type of local relationship is expected. The unknown model parameters (i.e., all terms of Eq. 2b having subscripts that include m) and the optimal embedding dimension D are both determined by separate iterative procedures, also as discussed below.

The output distribution $p(y, \vec{x}|c_m)$ is given in terms of the likelikhood of the output data given the model; it is necessary to invert this probability in order to maximize the likelihood of the model given the data:

$$p(c_m \mid y, \vec{x}) = \frac{p(y, \vec{x} \mid c_m) p(c_m)}{p(y, \vec{x})} = \frac{p(y, \vec{x} \mid c_m) p(c_m)}{\sum_{m=1}^{M} p(y, \vec{x} \mid c_m) p(c_m)} \tag{Eq. 3}$$

The posterior probabilities can be used to find the cluster weights as follows:

$$p(c_m) = \int p(y,\vec{x}c_m)dy\,d\vec{x} = \int p(c_m \mid y,\vec{x})p(y,\vec{x})dy\,d\vec{x} \approx \frac{1}{N}\sum_{n=1}^{N} p(c_m \mid y_n, \vec{x}_n) \quad \text{(Eq. 4)}$$

Eq. 4 follows because an integral over a density can be approximated by an average over variables drawn from the density. The practical result is the ability to utilize a sum of experimentally derived measurements rather than an integral over a continuous function.

As stated previously, the approach of the present invention does not require preliminary specification of model parameters. Using the foregoing framework, the model parameters may be found from the data itself using an iterative technique such as the Expectation-Maximization ("E-M") procedure, alternately calculating the likelihood of the data $p(y, \vec{x} \mid c_m)$ given the current parameters, then choosing new parameters that maximize the posterior probability $p(c_m \mid y, \vec{x})$ given known data. Initially, a trial set of cluster parameters is chosen at random, and the process continued until the overall likelihood reaches a maximum.

More specifically, following initial calculation of $p(c_m \mid y, \vec{x})$, the expected input mean $\mu$ of each cluster is computed as follows:

$$\vec{\mu}_m^{new} = \int \vec{x}p(\vec{x} \mid c_m)d\vec{x} = \int \vec{x}p(y,\vec{x} \mid c_m)dy\,d\vec{x} = \int \vec{x}\frac{p(c_m \mid y,\vec{x})}{p(c_m)}p(y,\vec{x})dy\,d\vec{x} \approx \frac{1}{Np(c_m)}\sum_{n=1}^{N}\vec{x}_n p(c_m \mid y_n,\vec{x}_n) \equiv \langle\vec{x}\rangle_m$$

where the last quantity defines the cluster-weighted expectation of the mean (that is, with reference to FIG. 1, the mean value of $\vec{x}$ within either input probability distribution 126, 128 associated with a respective local model 122, 124). The input variances (again with reference to FIG. 1, the variances of the probability distributions 126, 128) are computed from the updated mean, current values being iteratively updated by taking the cluster-weighted expectation of the input distribution $$\sigma_{m,d}^{2,new} = \{(x_d - \mu_{m,d})^2\}_m$$

Starting with randomly chosen cluster parameters, the iterated parameters rapidly converge on the local maximum of the probability of the data set given the model, and through the sum over clusters in the denominator of the posterior probability, the clusters interact so that they each specialize in data poorly explained by other clusters.

Once the cluster input parameters are found from these expectations, the model parameters $\beta_m$ are found by maximizing the likelihood of the data as a function of the cluster parameters:

$$0 = \frac{\partial}{\partial\beta_m}\langle p(y,\vec{x})\rangle_m = \frac{\partial}{\partial\beta_m}\langle p(y \mid \vec{x}, c_m)p(\vec{x} \mid c_m)\rangle_m$$

Since the logarithm function is monotonic, it is possible to maximize the expected value of the logarithm instead:

$$0 = \frac{\partial}{\partial\beta_m}\langle\log[p(y \mid \vec{x}, c_m)p(\vec{x} \mid c_m)]\rangle_m = \frac{\partial}{\partial\beta_m}\langle\log p(y \mid \vec{x}, c_m)\rangle_m = \left\langle[y - f(\vec{x},\beta_m)]\frac{\partial f(\vec{x},\beta_m)}{\partial\beta_m}\right\rangle_m$$

The $\beta_m$ values are used to find the output variances:

$$\sigma_{m,y}^{2,new} = \{[y - f(\vec{x},\beta_m)]^2\}_m$$

The object of the analysis, of course, is to predict y from an instance of the feature vector $\vec{x}$ (that is, the inaccessible relevant system degrees of freedom represented by accessible time lags on y and $\vec{u}$)—for example, to obtain the expected value of y given a particular feature vector $\vec{x}$, or $\{y \mid \vec{x}\}$. This quantity is given as $$\langle y \mid \vec{x}\rangle = \int yp(y \mid \vec{x})dy = \int y\frac{p(y \mid \vec{x})}{p(\vec{x})}dy = \frac{\sum_{m=1}^{M}\int yp(y \mid \vec{x}, c_m)dy\,p(\vec{x} \mid c_m)p(c_m)}{\sum_{m=1}^{M}p(\vec{x} \mid c_m)p(c_m)} = \frac{\sum_{m=1}^{M}f(\vec{x},\beta_m)p(\vec{x} \mid c_m)p(c_m)}{\sum_{m=1}^{M}p(\vec{x} \mid c_m)p(c_m)} \quad \text{(Eq. 5)}$$

Thus, with the model parameters and cluster weights characterized, the expected value of y is straightforwardly obtained from a given feature vector $\vec{x}$. Optionally, it is possible to store the clusters hierarchically, such that it is unnecessary to include contributions from distant clusters.

The total variance in y—that is, the total output error—is the weighted sum of the variances $\sigma_{m,y}^2$ associated with each local model. It is also possible, however, to characterize the expected error for y given a particular feature vector $\vec{x}$, or $\{\sigma_y^2 \mid \vec{x}\}$. This quantity is given as $$\langle\sigma_y^2 \mid \vec{x}\rangle = \int(y - \langle y \mid \vec{x}\rangle)^2 p(y \mid \vec{x})dy = \int(y^2 - \langle y \mid \vec{x}\rangle^2)p(y \mid \vec{x})dy$$

-continued $$= \frac{\sum_{m=1}^{M} [\sigma_{m,y}^2 + f(\vec{x}, \beta_m)^2] p(\vec{x} \mid c_m) p(c_m)}{\sum_{m=1}^{M} p(\vec{x} \mid c_m) p(c_m)} - \langle y \mid \vec{x} \rangle^2$$

For a stochastic system, it is also possible to generate samples drawn directly from the distribution to emulate the behavior of the modeled system.

If the output model is written as a linear sum of basis functions $$f(\vec{x}, \beta_m) = \sum_{i=1}^{I} \beta_{m,i} f_i(\vec{x})$$

$$0 = \langle [y - f(\vec{x}, \beta_m)] f_j(\vec{x}) \rangle_m$$

$$= \langle y f_j(\vec{x}) \rangle_m - \sum_{i=1}^{I} \beta_{m,i} \langle f_j(\vec{x}) f_i(\vec{x}) \rangle_m$$

Defining $a_j = \{y f_j(\vec{x})\}_m$ and $B_{ji} = \{f_j(\vec{x}) f_i(\vec{x})\}_m$, the new value of $\beta$ can be found from $\beta_m = B^{-1} \cdot \vec{a}$.

For example, the local models 122, 124 in FIG. 1 are linear functions in $\beta$. The model parameters $B^{-1}$ and $\vec{a}$ are calculated by iterative analysis of the joint probability distribution according to Eqs. 2a–2g. The inverse of the matrix B is preferably a pseudo-inverse.

Figure 2:
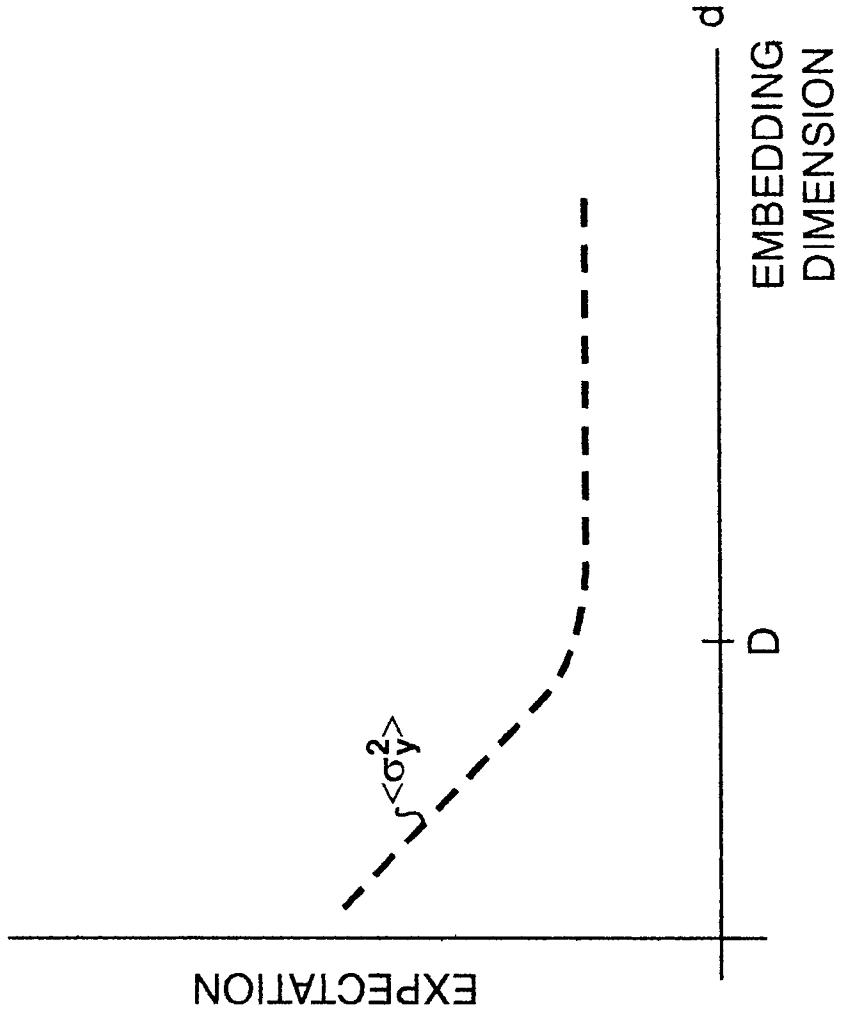
FIG. 2 graphically depicts the relationship between the embedding dimension and expected error.

The foregoing discussion describes use of the invention to model the physical behavior of a driven, dynamic system based on a training set of inputs and outputs. The analysis assumes, however, an optimal number of embedding dimensions as well as M, the number of local models (and clusters). The variance quantities discussed above can be used to identify optimal values for these parameters. Refer to FIG. 2, which illustrates the manner in which varying the embedding dimension (given the training set $\{y_n, u_n\}_{n=1}^{N}$) affects the total error $\{\sigma_y^2\}$. The total error stops decreasing—that is, the curve reaches a plateau and no further improvements in error are obtained—when the embedding dimension d is sufficiently high. Values of d above this optimal level are superfluous, wasting computational resources and possibly introducing some unwanted modeling of noise.

Figure 3:
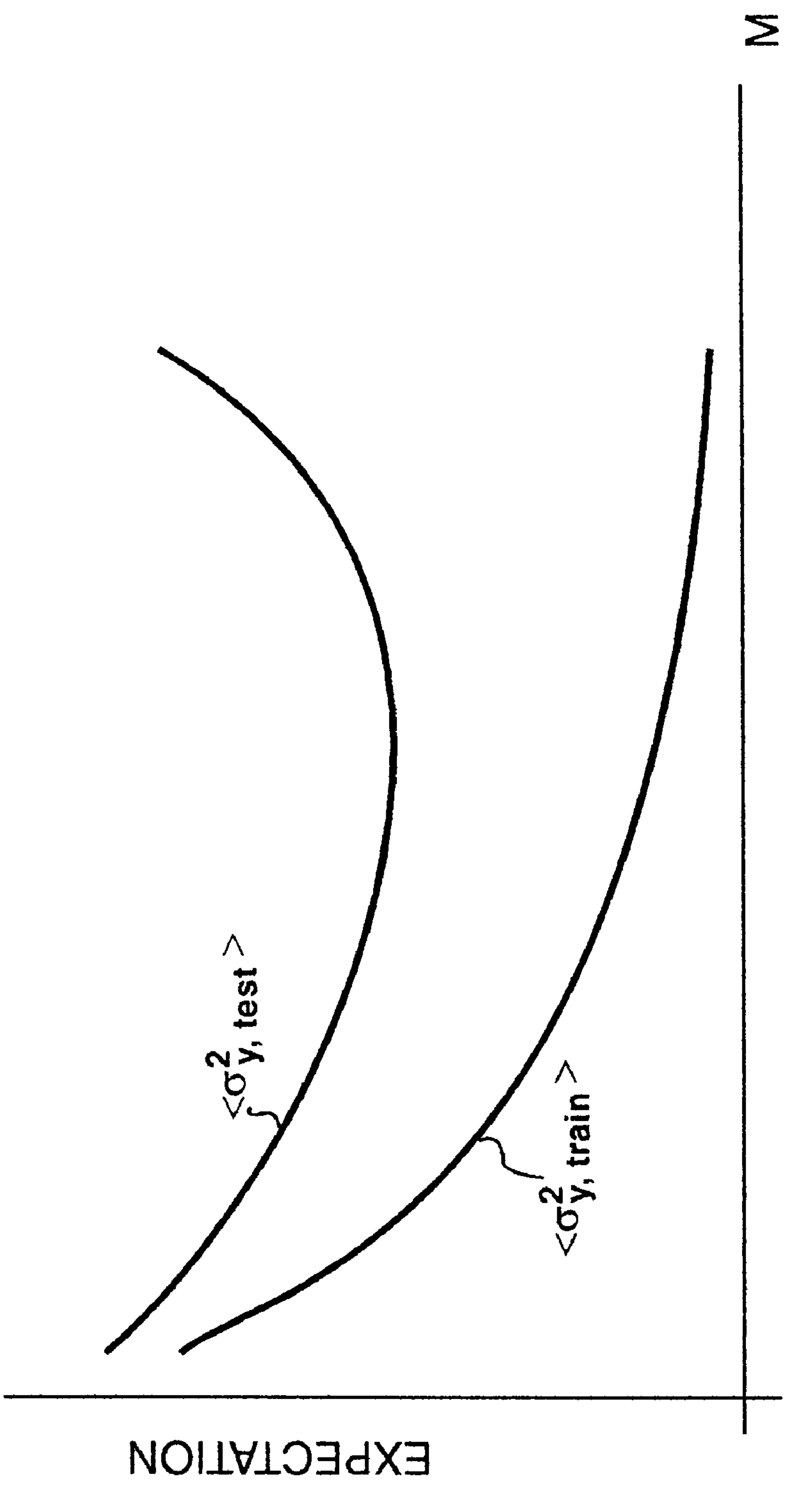
FIG. 3 graphically depicts the relationship between the number of clusters and error.

For purposes of determining optimal numbers of clusters, one can withhold a subset of the measured data for testing the model; then by the technique of cross-validation, the model is developed using the training data, and its performance evaluated against both the training and testing data. FIG. 3 illustrates the relationship between M and the total variance $\sigma_{y,train}^2$ within the training set $\{y_n, u_n\}_{n=1}^{N}$ (i.e., the data not withheld for testing), and the total variance $\sigma_{y,test}^2$ within a set of test performances of the model (that is, predicted values of y from sensed input stimuli u). Although increasing values of M naturally reduces training error on a continuous basis, excessive levels of M actually increase testing error. As noted earlier, this results from "overfitting," where the model is excessively precise and captures noise as well as legitimately generalizable behavior. On the other hand, too few clusters "underfit" and fail to provide an adequately complete behavior model. Accordingly, goodness of fit can be modeled as an error function, and an optimal value of M chosen by minimizing testing error. If the testing error cannot be brought sufficiently low or if the behavior shown in FIG. 3 is not observed, the number of sensors used to record input stimuli may be insufficient.

2. Operation of the Invention

Figure 4:
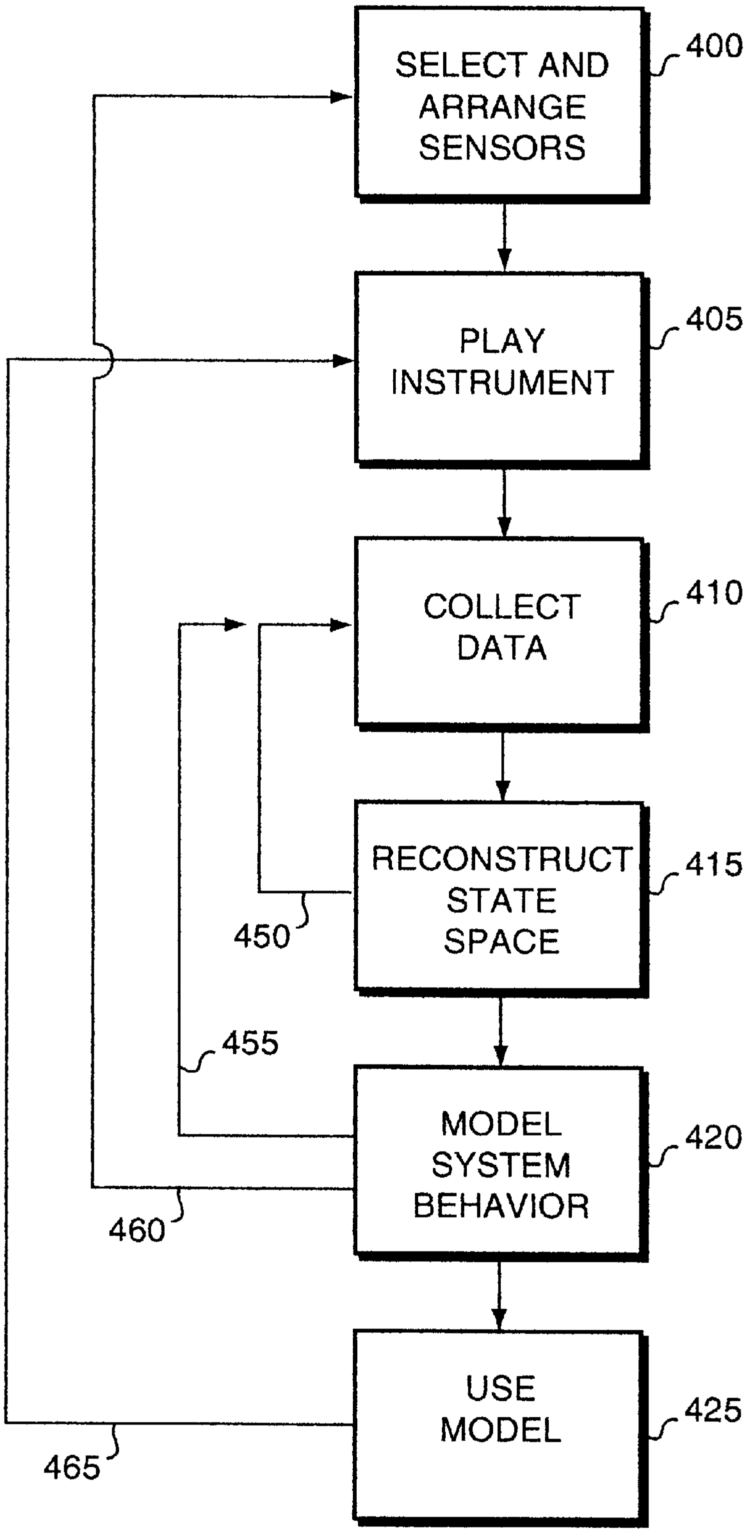
FIG. 4 is a flow chart illustrating operation of the method of the invention.

As shown in FIG. 4, operation of the invention can be expressed in a series of steps, with iterative loops among steps followed as necessary for optimization. The illustrated steps assume, for purposes of illustration, modeling of a musical instrument, it being understood that the invention is not limited in its capability to this domain of complex, driven physical systems. In a first step 400, a series of sensors for measuring input and output is arranged about the instrument; for example, the output sensors might be electronic transducers that convert sound or vibration into an electronic signal, while the input sensors might detect the instantaneous position of a user's hand or finger with respect to the instrument. A sensor arrangement suitable for, e.g., bowed musical instruments is disclosed in U.S. Pat. No. 5,247,261, the entire disclosure of which is hereby incorporated by reference.

In step 405, the user plays the instrument with the sensors active and providing signals to, for example, a digital computer (by means of suitable analog-to-digital converters, if necessary) programmed to accumulate and assign values to these signals. In step 410, the data are arranged in timewise sets, i.e., segregated so that data obtained at identical times remain grouped. These training data form the basis of a time-lag embedding step, the resulting lag vector including time lags on sensed values for both input and output.

Based on the lag vector and a selected number of local models of system behavior (whose form, but not parameter values, is known), the behavior of the system is modeled in accordance with the cluster-weighted approach set forth above. In particular, the joint probability density is characterized from the clusters, enabling prediction of future output values based on current and lagged states and a given input stimulus (i.e., $\{y|\vec{x}\}$). In step 425, the model is employed to synthesize the original physical system. For example, the user might "play" a noiseless replica of the original instrument, the input sensors generating predicted output (e.g., driving loudspeakers) based on the model.

Steps may be repeated in accordance with any of four processing loops 450, 455, 460, 465, iteration along which is used to optimize various aspects of performance. Step 415, for example, requires multiple time-lagged measurements in accordance with the embedding dimension D, necessitating repeated collections of data to form the training set. The first execution of the embedding step 415 uses a small embedding dimension D, which is increased until the approximation is adequate; however, as expected output variance (i.e., $\{\sigma_y^2\}$) is characterized through implementation of the model, D can be adjusted (loop 455) to an optimal value. Similarly, modeling step 420 can reveal inadequacies in the number and/or configuration of sensors if the testing error cannot be brought sufficiently low or if the behavior shown in FIG. 3 is not observed; in this case, step 400 is repeated (i.e., the sensor array is altered and/or augmented) until the testing error observed as a result of step 420 is abated (loop 460).

Finally, actual use of the model accomplishes two important objectives. First, a testing set of inputs and outputs is used to establish the optimal number of clusters and local models (loop 465) in accordance with observed output errors; and also to ensure that the set of training inputs is adequate to generate a model robust enough for its intended use. For example, if the training set is too limited in terms of exploring the system's dynamics, the model will not include relevant internal degrees of freedom, and will not produce accurate output through the full range of possible inputs. In this sense, however, "too limited" is meaningful only in terms of intended use; so long as the training set is consistent with the range of possible inputs, the model will produce accurate output.

3. Application of the Invention

Figure 5:
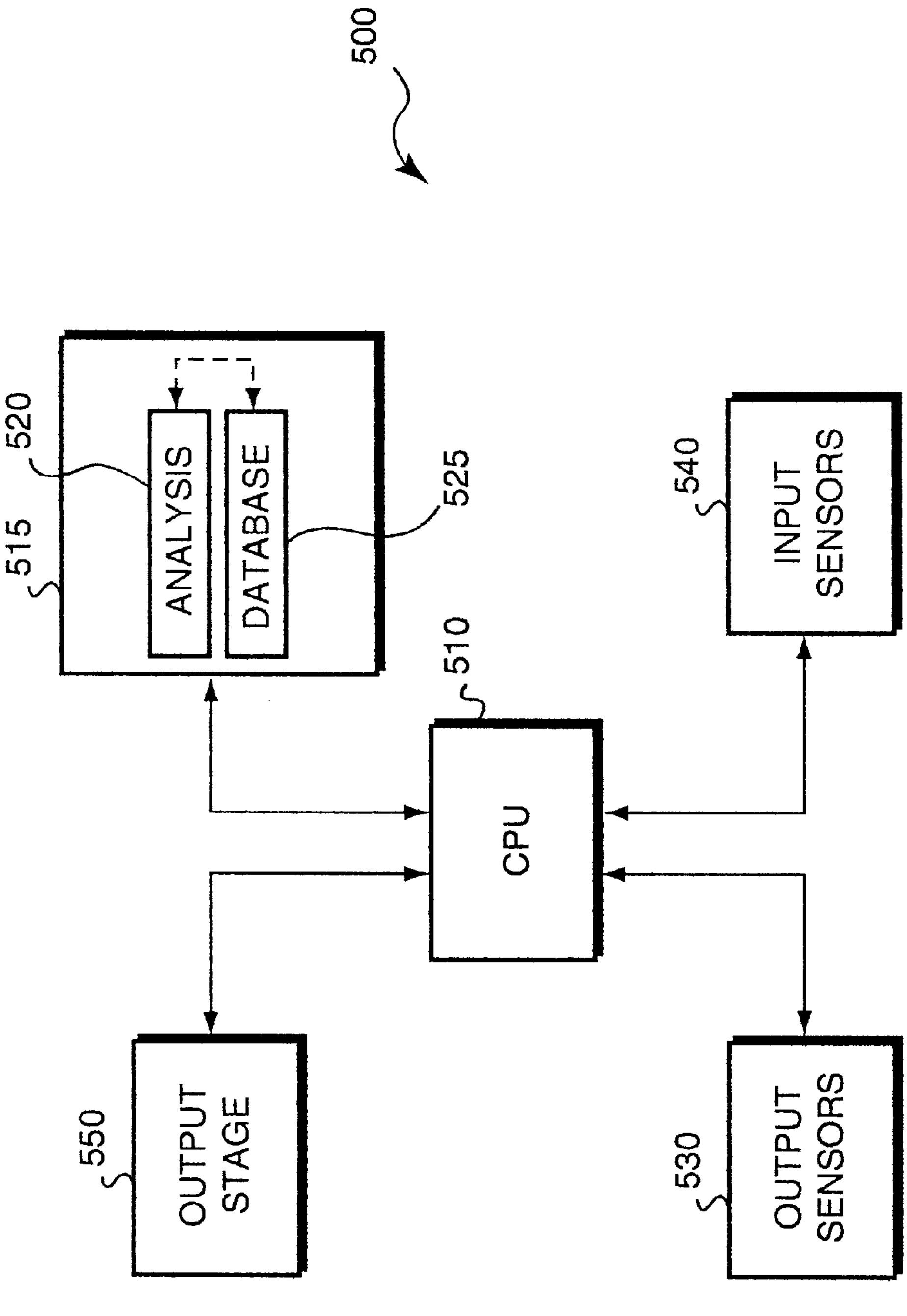
FIG. 5 schematically depicts a representative hardware implementation of the invention.

Refer now to FIG. 5, which illustrates, in block-diagram form, a representative hardware embodiment of the present invention. The apparatus, indicated generally at 500, is driven by a central-processing unit ("CPU") 510, which is typically a high-speed microprocessor or microprocessor array capable of processing, in real-time, the model derived as described above to generate predicted output values as the user provides input. Apparatus 500 includes a main computer memory 515, which contains a group of modules that control the operation of CPU 510 and its interaction with the other hardware components. An operating system (not shown) directs the execution of low-level, basic system functions such as memory allocation, file management and operation of mass storage devices. At a higher level, an analysis module 520, implemented as a series of stored instructions, directs execution of the primary functions performed by the invention, as discussed above. In particular, analysis module 520 executes steps 410, 415, 420 shown in FIG. 4. Associated with analysis module 520 is a database 525, which is generally a memory partition, and which accumulates data associated with training, testing, and use of the model generated by analysis module 520, as well as data representing the parameters of the model itself.

A set of output sensors 530 (as in, for example, the '261 patent) gather data representative of the output of the system under study in response to physical manipulations, while a series of input sensors 540 (e.g., in the context of a musical instrument, a similar set of sensors arrayed on a replica of the instrument, or a keyboard each of whose keys represent a predetermined input mode) gather data representative of those manipulations. The outputs of all sensors are provided as digital signals to CPU 510, which stores them in database 525. As indicated previously, data corresponding to the training set is grouped in a timewise fashion to facilitate embedding synthesis.

Following generation of the model, the user provides input to the apparatus 500, for example by "playing" a replica of the system under study so that the user's gestures, movements or other operations relevant as system input are monitored and provided to the model, which computes an expected output (e.g., an audio time series) therefrom. It should be stressed that the arrangement used to "play" (i.e., provide input to) the model is a matter of design choice, and may be quite different from the sensor arrangement initially used to gather data to build the model. All that is necessary is an arrangement capable of capturing or otherwise representing manipulations representative of (or which can be mapped to) the manner in which the original system is manipulated.

That output is presented in real-time by means of an output stage 550, which ideally is capable of producing responses characteristic of the physical system itself. In the case of a musical instrument, for example, output stage 550 includes suitable digital-to-analog, amplifier and audio-processing electronics, as well as a loudspeaker, for producing an audio response.

Figure 6A:
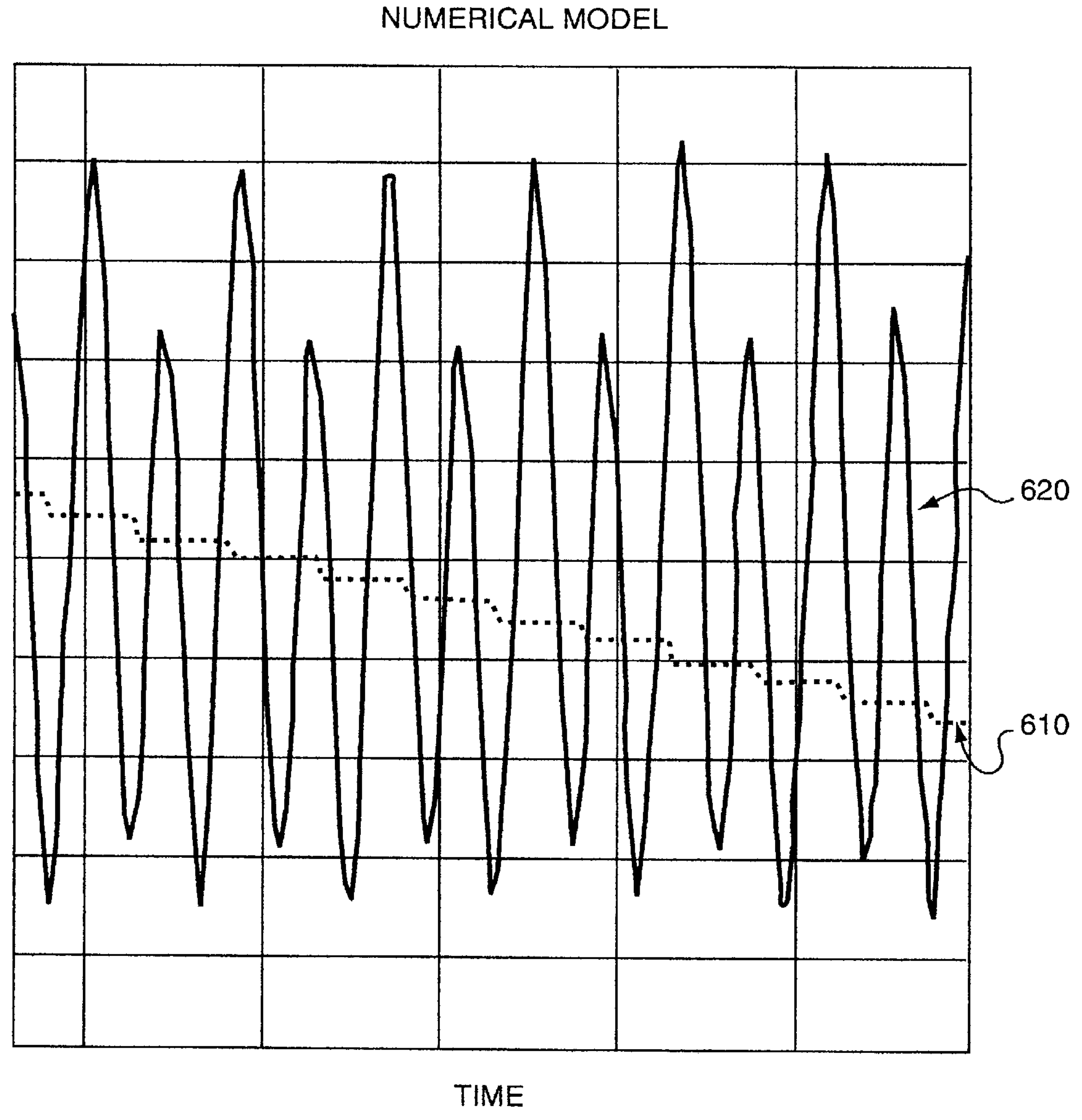
FIGS. 6A and 6B graphically illustrate application of the invention to the behavior of a bowed string.
Figure 6B:
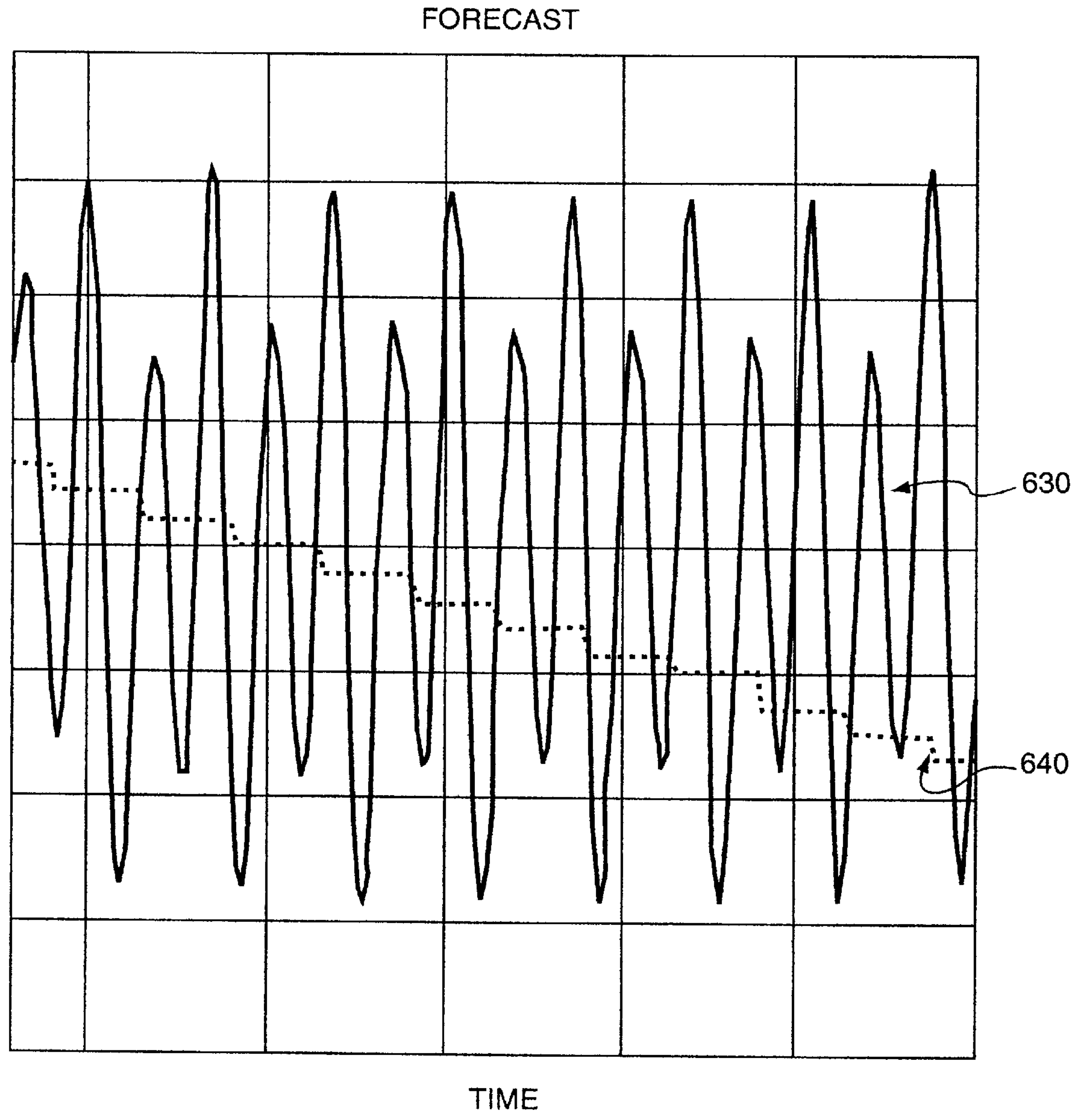

Operation of the invention, and the dimensional reduction obtainable therewith, are depicted in FIGS. 6A, 6B. The physical system illustrated by the figures is a sticky bow drawn across a damped string. With reference to FIG. 6A, a numerical model is used to represent the action of the bow along the string; the slowly descending, discretely sampled curve 610 shows the changing position of the bow as it is drawn, and the curve 620 is the resulting output audio time series. (In other words, the y-axis with respect to curve 610 represents position, while with respect to curve 620 represents amplitude.) The highly accurate but computationally intensive numerical model used to generate FIG. 6A requires 54 degrees of freedom.

Using the techniques set forth above, a predictive model was generated using an embedding vector consisting of five lags of audio and two samples of bow position, for a total of seven degrees of freedom. An audio time series 630 was generated from the predictive model by specifying the illustrated bowing action. As can be seen from comparison of the two figures, the predictive model accurately represents the far more complex "true" behavior of the numerical model with far fewer degrees of freedom.

It should again be emphasized that the example of a musical instrument is for purposes of presentation and not limitation. The present invention is capable of modeling the behavior of a wide range of driven, dynamic systems. The invention may be used, for example, to model the flight behavior of an aircraft in response to various manipulations of aircraft controls (stabilizer, rudder, flaps, thrust, etc.) or environmental inputs (e.g., to model the effects of turbulence), the model being implemented as a flight simulator. In another implementation, the invention is used to model non-linear circuit elements (e.g., microwave devices the outputs of which depend nonlinearly on the input); the device is placed in a circuit, and the above-described techniques used to define a model of device behavior.

It will therefore be seen that the foregoing represents a computationally tractable and highly flexible approach to synthesis of complex physical systems. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of emulating output characteristics of a nonlinear physical system that generates an output in response to physical manipulation, the method comprising the steps of:

a. generating a set of response characteristics by imposing a plurality of input manipulations on the system and measuring the resulting outputs;

b. based on the response characteristics, reconstructing a set of system internal degrees of freedom;

c. based on the system internal degrees of freedom, modeling an emulation process relating the internal degrees of freedom to system outputs, the emulation process predicting a system output based on the internal degrees of freedom; and d. producing a predicted system output from a manipulation by (i) estimating values for the internal degrees of freedom based on the manipulation, and (ii) using the emulation process to generate the output based on the estimated internal degrees of freedom.

2. The method of claim 1 wherein the internal degrees of freedom and system outputs are related as a joint probability density.

3. The method of claim 1 wherein the step of reconstructing a set of system internal degrees of freedom is accomplished by time-delay embedding.

4. The method of claim 2 wherein the step of modeling an emulation process comprises expanding the joint probability density in a plurality of clusters, each cluster (i) being associated with a local model relating the internal degrees of freedom to system outputs and (ii) valid over a range of values of the internal degrees of freedom according to a probability distribution, the joint probability density for a set of values for the internal degrees of freedom being a weighted sum of the clusters in accordance with the probability distributions thereof.

5. The method of claim 2 wherein the step of modeling an emulation process comprises expanding the joint probability density in a plurality of clusters, each cluster being associated with a local model relating the internal degrees of freedom to system outputs, various of the clusters being valid at different times.

6. The method of claim 1 wherein the system is a musical instrument and the output is an audio time series.

7. The method of claim 3 further comprising the steps of:

a. determining an optimal embedding dimension by computing an expected total error associated with the emulation process, the expected total error varying with the embedding dimension; and b. selecting the embedding dimension producing a minimal expected total error.

8. The method of claim 4 further comprising the steps of:

a. determining an optimal number of clusters by computing an error factor associated with a plurality of executions of the emulation process, the error factor varying with the number of clusters; and b. selecting the number clusters producing a minimum error factor.

9. The method of claim 8 wherein the error factor is obtained by cross-validation using a set of training data and a set of testing data.

10. A method of modeling at least one output characteristic of a system based on a set of input parameters, the method comprising the steps of:

a. modeling an emulation process relating the at least one output characteristic to the input parameters according to a joint probability density therebetween by expanding the joint probability density in a plurality of clusters, each cluster (i) being associated with a local model relating the at least one output characteristic to the input parameters and (ii) valid over a range of values of the input parameters according to a probability distribution, the joint probability density for an input set of values for the input parameters being a weighted sum of the clusters in accordance with the probability distributions thereof;

b. providing a set of input values for the input parameters; and c. using the emulation process to produce the at least one output characteristic.

11. Apparatus for emulating output characteristics of a deterministic physical system that generates an output in response to physical manipulation, the apparatus comprising:

a. input-sensing means, associated with the system, for sensing an input to the system;

b. output-sensing means, associated with the system, for sensing an output from the system;

c. processing means coupled to the input-sensing means and the output-sensing means, the processing means being configured to:

i. generate a set of response characteristics based on a plurality of sensings from the input-sensing and the output-sensing means;

ii. based on the response characteristics, reconstruct a set of system internal degrees of freedom;

iii. based on the system internal degrees of freedom, relate the internal degrees of freedom to system output to thereby enable prediction of a system output based on the internal degrees of freedom; and iv. produce a predicted system output from a manipulation to the system sensed by the input-sensing means by (i) estimating values for the internal degrees of freedom based on the manipulation, and (ii) generating the predicted system output based on the estimated internal degrees of freedom; and d. output means for transforming the predicted system output into an output emulating the system output.

12. The apparatus of claim 11 wherein the predicted system output is an audio time series and the output means is configured to transform the time series into sensible audio.

13. The apparatus of claim 11 wherein the processing means relates the internal degrees of freedom and system outputs as a joint probability density.

14. The method of claim 11 wherein the system internal degrees of freedom are modeled by time-delay embedding.

15. The apparatus of claim 13 wherein the joint probability density is expanded in a plurality of clusters, each cluster (i) being associated with a local model relating the internal degrees of freedom to system outputs and (ii) valid over a range of values of the internal degrees of freedom according to a probability distribution, the joint probability density for a set of values for the internal degrees of freedom being a weighted sum of the clusters in accordance with the probability distributions thereof.

16. The apparatus of claim 13 wherein the joint probability density is expanded in a plurality of clusters, each cluster being associated with a local model relating the internal degrees of freedom to system outputs, various of the clusters being valid at different times.

17. Apparatus for modeling at least one output characteristic of a system based on a set of input parameters, the apparatus comprising:

a. input means for obtaining the input parameters;

b. means for modeling an emulation process relating the at least one output characteristic to the input parameters according to a joint probability density therebetween by expanding the joint probability density in a plurality of clusters, each cluster (i) being associated with a local model relating the at least one output characteristic to the input parameters and (ii) valid over a range of values of the input parameters according to a probability distribution, the joint probability density for an input set of values for the input parameters being a weighted sum of the clusters in accordance with the probability distributions thereof; and c. means for producing the at least one output characteristic from the emulation process.

* * * * *